Jan. 14, 1969 C. J. SABONIS 3,422,358

CIRCUIT BOARD MOUNTING ASSEMBLY FOR A RADIO OR THE LIKE

Filed Jan. 3, 1966

INVENTOR:
CHARLES J. SABONIS,

BY Norman C. Fulmer

HIS ATTORNEY.

United States Patent Office 3,422,358
Patented Jan. 14, 1969

3,422,358

CIRCUIT BOARD MOUNTING ASSEMBLY FOR A RADIO OR THE LIKE

Charles J. Sabonis, Utica, N.Y., assignor to General Electric Company, a corporation of New York Filed Jan. 3, 1966, Ser. No. 518,143
U.S. Cl. 325—353 5 Claims
Int. Cl. H04b *1/08;* H05k *5/00*

ABSTRACT OF THE DISCLOSURE

A circuit board assembly including a speaker affixed thereto, a cabinet including a slot receiving one edge of the circuit board and a flexible rib engaging the loudspeaker to retain the circuit board assembly in the cabinet.

This invention relates to arrangements for assembling radios and the like.

Various arrangements have been devised for assembling radios and the like, such as by attaching a circuit board to a portion of a cabinet by means of screws or other fastening devices, and then attaching the rest of the cabinet.

An object of the invention is to provide an improved assembly for radios and the like.

Another object is to provide a new radio assembly which does not require the use of screws or other conventional fastening devices for attaching a circuit board to a cabinet.

A further object is to provide an arrangement in which a circuit board is "snapped" into a cabinet.

Additional objects will be apparent from the following description and claims, and from the accompanying drawing.

The invention comprises, briefly and in a preferred embodiment, an arrangement for assembling a circuit board to a cabinet, comprising a circuit board having a loudspeaker attached thereto, and a cabinet comprising one or more integral brackets thereon for engaging an edge of the circuit board, and a flexible rib arrangement integral with the cabinet for engaging the loudspeaker when placed into position, whereby the circuit board and loudspeaker combination is held in place in the cabinet without the need for using conventional fastening devices.

Figure 1:
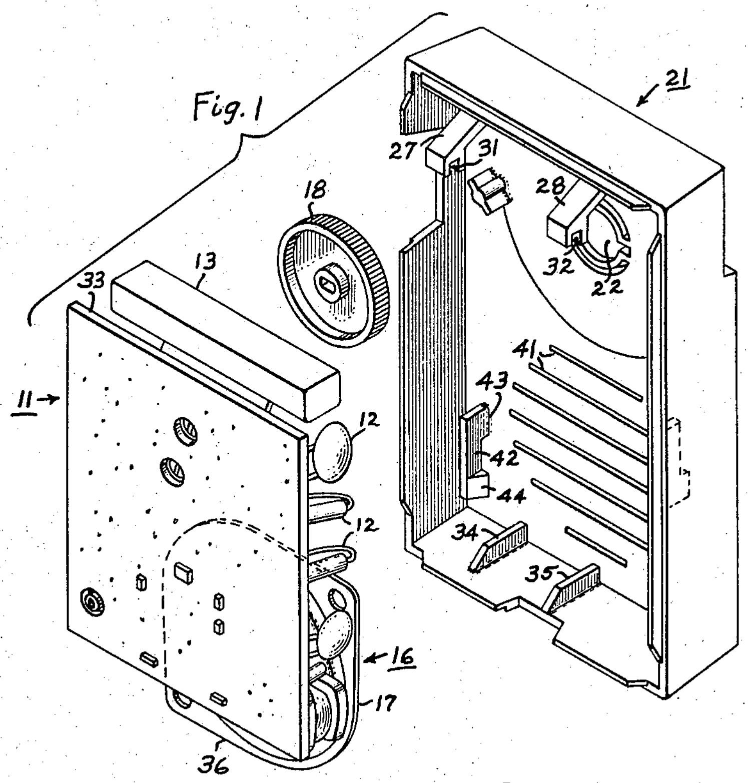
Figure 2:
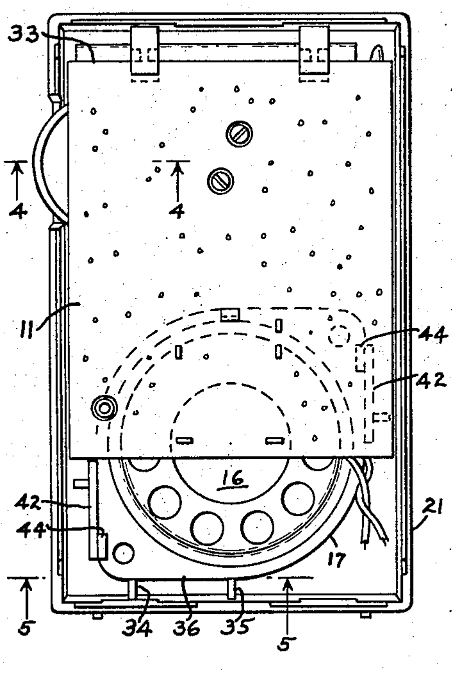
Figure 3:
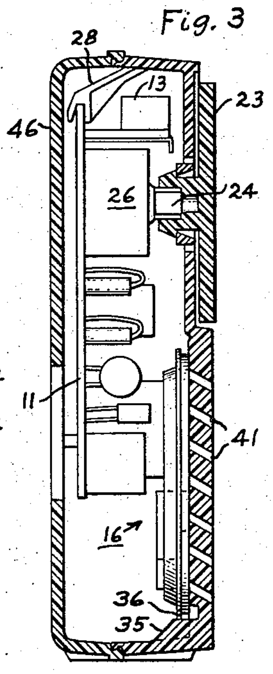
Figure 5:
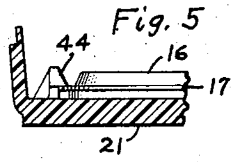
Figure 4:
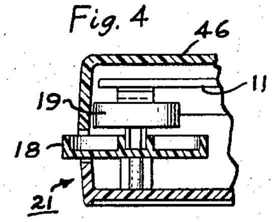

In the drawing, FIG. 1 is an exploded perspective view of a preferred embodiment of the invention, FIG. 2 is a rear view of FIG. 1 in assembled condition, FIG. 3 is a side view, partly in cross-section, of FIG. 2, FIG. 4 is a cross-sectional view taken on the line 4—4 of FIG. 2, and FIG. 5 is a cross-sectional view taken on the line 5—5 of FIG. 2.

A circuit board 11 carries various circuit components 12, and also may carry a rod-like antenna 13. A loudspeaker 16 also is carried by the circuit board 11, and includes a frame having an outwardly extending flange 17 at the forward extremity thereof. A volume control knob 18 is adapted to be attached to a volume control 19. A front portion 21 of a cabinet is provided with an opening 22 adapted to receive a tuning knob 23 for attachment to the control shaft 24 of a tuning device 26. A pair of notched brackets 27 and 28 extend inwardly from the upper edge of the cabinet 21, as shown, and are provided with slots 31, 32 adapted to receive and hold the upper edge 33 of the circuit board 11. Guide ribs 34 and 35 are provided inside the cabinet member 21 at the bottom thereof, and are dimensioned so that when the top edge 33 of the circuit board 11 is inserted into the slots 31 and 32, the bottom edge 36 of the loudspeaker flange 17 will ride along the ribs 34 and 35, whereby the ribs 34 and 35 will prevent the circuit board 11 from coming out of the slots 31 and 32.

Suitable openings 41 are provided in the cabinet front 21 in front of the location of the loudspeaker 16. One or more flexible ribs 42 are provided on the inside of the front cabinet member 21, and preferably are molded integrally therewith. The flexible ribs 42 are attached at ends 43 thereof to the cabinet, and extend parallel to the cabinet, as shown, and terminate in tapered end portions 44, the tapering thereof extending inwardly from the flexible ribs 42, as shown, so that the device may be assembled by inserting the upper edge 33 of the circuit board 11 into the slots 31 and 32, and pushing the lower portion of the circuit board toward the front of the cabinet front 21, so that the loudspeaker flange 17 engages the sloped end portions 44 of the flexible ribs 42, thereby deflecting these ribs, and when the flange 17 rides past the beveled end portions 44, the flexible ribs snap over the rear of the flange 17, thereby locking the circuit board-loudspeaker assembly 11, 16 securely to the cabinet front 21.

The device may be disassembled, if desired, by deflecting the flexible ribs 42 such as by forcing them sideways with a screwdriver, so that the circuit board 11 and loudspeaker 16 combination can be removed. To complete the assembly, a rear portion 46 of the cabinet is attached to the front cabinet portion 21.

From the foregoing, it will be realized that the invention achieves its objectives, and provides a convenient and low-cost, yet reliable, assembly for radios and the like.

While a preferred embodiment of the invention has been shown and described, various other embodiments and modifications thereof will be apparent to persons skilled in the art, and will fall within the scope of the invention as defined in the following claims.

What I claim is:

1. An arrangement for assembling a radio or the like, comprising a circuit board, a loudspeaker attached to said circuit board and provided with an outwardly extending flange at the front thereof, and a cabinet provided with means defining at least one inwardly facing slot adapted to fit over an edge of said circuit board, and at least one flexible rib carried by said cabinet on the inside thereof adapted to be deflected by said loudspeaker flange during assembly and lock over said flange to hold the circuit board and loudspeaker in place in said cabinet.

2. An arrangement as claimed in claim 1, in which a wall of said cabinet is provided with a pair of integral inwardly extending brackets, said inwardly facing slots being provided in said brackets.

3. An arrangement as claimed in claim 2, in which said cabinet is provided with at least one inwardly extending rib on the wall thereof opposite said wall provided with brackets.

4. An arrangement as claimed in claim 1, in which said flexible rib is molded integrally with said cabinet.

5. An arrangement as claimed in claim 1, in which said flexible rib extends parallel to the front of said cabinet and is provided with a tapered portion to cause the rib to deflect when contacted by said speaker flange during assembly.

References Cited

UNITED STATES PATENTS

| | | | |
|---|---|---|---|
| 2,549,021 | 4/1951 | Setchell | 325—353 |
| 2,567,829 | 9/1961 | Suthaun | 325—352 |
| 2,991,356 | 7/1961 | Harasek | 312—7 XR |
| 3,159,436 | 12/1964 | Davis | 312—7 XR |
| 3,215,380 | 11/1965 | Morris et al. | |

WILLIAM C. COOPER, *Primary Examiner.*

R. S. BELL, *Assistant Examiner.*

U.S. Cl. X.R.

312—7